US007080927B2

(12) United States Patent
Feuerborn et al.

(10) Patent No.: US 7,080,927 B2
(45) Date of Patent: Jul. 25, 2006

(54) MODULAR LIGHTING WITH BLOCKS

(76) Inventors: Stephen Feuerborn, 135 Plymouth St. #403, Brooklyn, NY (US) 11201; David Bruce Liatti, 135 Plymouth St. #403, Brooklyn, NY (US) 11201

( * ) Notice: Subject to any disclaimer, the term of this patent is extended or adjusted under 35 U.S.C. 154(b) by 92 days.

(21) Appl. No.: 10/874,515

(22) Filed: Jun. 23, 2004

(65) Prior Publication Data

US 2005/0007780 A1 Jan. 13, 2005

Related U.S. Application Data

(60) Provisional application No. 60/485,488, filed on Jul. 9, 2003.

(51) Int. Cl.
*B60Q 1/00* (2006.01)

(52) U.S. Cl. ...................... 362/368; 362/238; 362/250; 362/655; 40/552

(58) Field of Classification Search .................. 40/544, 40/552, 572; 362/234, 235, 238, 239, 250, 362/368; 439/928
See application file for complete search history.

(56) References Cited

U.S. PATENT DOCUMENTS

| | | | | |
|---|---|---|---|---|
| 1,602,892 | A * | 10/1926 | Frank | 40/572 |
| 1,760,767 | A * | 5/1930 | Muller | 40/541 |
| 2,216,220 | A * | 10/1940 | Baker | 362/147 |
| 4,096,379 | A | 6/1978 | Taylor | |
| 4,223,377 | A * | 9/1980 | Williams | 362/145 |
| 4,253,135 | A | 2/1981 | Black | |
| 4,413,311 | A | 11/1983 | Orenstein | |
| 4,532,579 | A * | 7/1985 | Merryman | 362/239 |
| 5,378,552 | A * | 1/1995 | Dixon, Jr. | 429/91 |
| 5,496,657 | A * | 3/1996 | Dixon, Jr. | 429/62 |
| 5,581,922 | A * | 12/1996 | Heimann | 40/605 |
| 5,660,461 | A | 8/1997 | Ignatius et al. | |
| 5,688,042 | A * | 11/1997 | Madadi et al. | 362/240 |
| 6,422,716 | B1 | 7/2002 | Henrici et al. | |
| 6,557,282 | B1 * | 5/2003 | Cleaver | 40/541 |
| 6,585,393 | B1 | 7/2003 | Brandes et al. | |
| 6,629,771 | B1 | 10/2003 | Chiu | |
| 6,761,471 | B1 * | 7/2004 | Wu | 40/541 |
| 2003/0142499 | A1 * | 7/2003 | Chiu | 362/368 |

* cited by examiner

*Primary Examiner*—Thomas M. Sember
*Assistant Examiner*—Adam Rehm
(74) *Attorney, Agent, or Firm*—Notaro & Michalos PC

(57) ABSTRACT

A modular light assembly is provided. The light assembly includes a light housing with sides, an electrical light source inside the housing and connected to a connector on at least one side of the housing, and a pin for pivotally, electrically and detachably connecting the side with the connector to a side of another housing having the connector. The connector includes a quarter turn receptacle set into a dielectric medium, which is surrounded by a conductive metal ring. The electrical light source may be a plurality of LED lamps connected to a printed circuit board, which is connected to the connector. The light assembly may also be connected to other electrical and non-electrical devices having a connector.

33 Claims, 3 Drawing Sheets

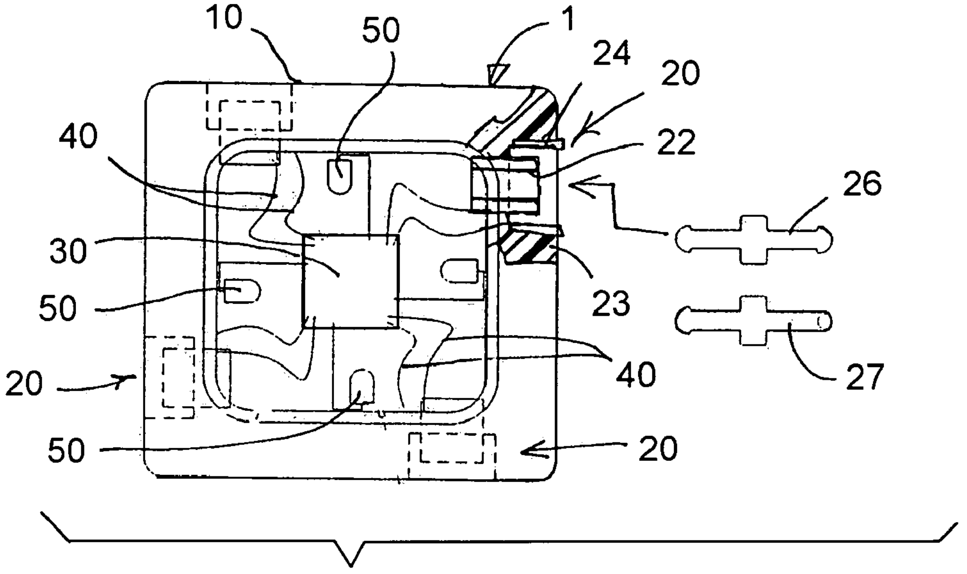
FIG. 1
FIG. 2
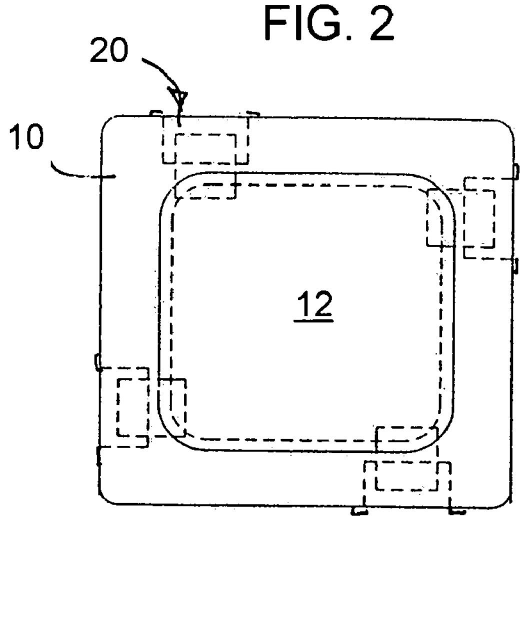
FIG. 3
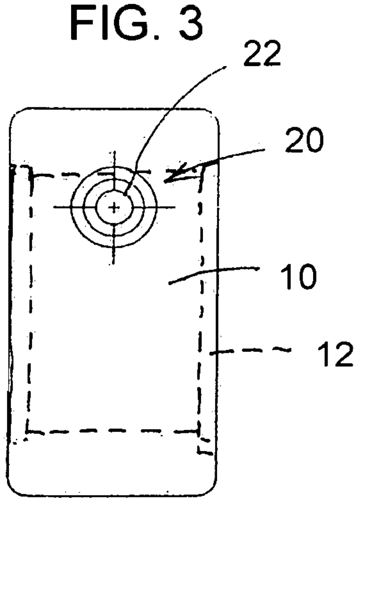

MODULAR LIGHTING WITH BLOCKS

CROSS-REFERENCE TO RELATED APPLICATION

This application claims the benefit of provisional application No. 60/485,488 filed on Jul. 9, 2003, and which is incorporated here by reference.

FIELD AND BACKGROUND OF THE INVENTION

The present invention relates generally to the field of lamp assemblies, and in particular to a lamp which can be attached to similar lamps in a variety of orientations or shapes for producing a sculpture.

Decorative lighting has always been an active and popular area of technology. From "Lava Lights" of the 60s which are even now in the $21^{st}$ century, enjoying a comeback, to the use of Christmas tree lights as permanent decorations in college dorms, lighting is often used to improve ones surroundings.

A variety of modular lamps are known in the art.

For example, U.S. Pat. No. 6,629,771 discloses a modular lamp unit for a lamp assembly. The lamp units may be placed in a planar or three-dimensional arrangement for decorative effect. Each lamp unit comprises an outer frame with four corners, a middle frame, and an inner frame enclosing a lamp. The outer frame has conductive blocks at each corner which form electrodes. The inner frame is pivotally connected to the middle frame, and the middle frame is pivotally connected to the outerframe. Adjacent lamp units are connected via connection units at the corners of the units. The connection unit can be a straight connection plate, an angle connection plate, or a hexagonal connection plate. However, attachment of one unit to another cannot be offset since attachment always occurs at the corners.

U.S. Pat. No. 6,422,716 discloses a modular LED assembly comprising at least two substantially identical LED modules. Each module has a non-conductive base with a straight edge and a pair of faces, an LED, and two conductive traces on the base connected to the LED. The modules are juxtaposed at the edges with the lines aligned with each other. The bases are coupled via a clip body. The alignment of the modules cannot be offset.

U.S. Pat. No. 5,660,461 discloses an LED array formed from a plurality of modular units that are snapped together via male and female type connectors on respective reflector units that have at least one reflector. The positioning of the connectors on each of the four sides of a reflector unit allows a wide variety of configurations for the completed array. The array may be rectangular for example. However, the positioning of the units are shown as side by side rather than offset.

U.S. Pat. No. 6,585,393 to Brandes et al. discloses a light fixture which uses a printed circuit board and is adapted to be modularly connected to other similar light fixtures. The light fixture has a housing with electrical endcaps on first and second ends. The printed circuit board is disposed inside the housing and is electrically connected to at least one of the electrical endcaps. The modules are rotatable relative to their respective mounting surface. However, the modules are not pivotally connected.

U.S. Pat. Nos. 4,096,379 and 4,253,135 disclose other modular light fixtures.

Finally, U.S. Pat. No. 4,413,311 teaches a connection system for mechanically and electrically joining a plurality of illuminated modules into a decorative lighting display. The connection system includes a plurality of rigid connectors with hollow tubular bodies. The connectors may be in the form of four-way or six-way connector, with arms extending along different axes, or simply a two-way connector for joining together two adjacent modules. A two-way connector is also disclosed for joining adjacent ends of modules in a right angled relationship. However, modules remain in geometrical arrangements.

Thus, a need remains for a modular light fixture and a means for pivotally connecting such fixtures in an offset relationship so that various patterns and shapes can be formed. A need also remains for new innovations in this field.

SUMMARY OF THE INVENTION

It is an object of the present invention to provide a modular lighting fixture comprising at least one housing having at least three sides connected to each other at a plurality of edges to form a polygon. The housing has a front surface and a rear surface for defining a volume in the housing and at least one electrically powered light source is in the volume. A separate connector in each of at least two of the sides is for pivotally connecting each side of the housing having a connector, to a side of another housing having a connector.

Another object of the invention is to provide a modular lighting fixture where each connector includes means for detachably pivotally connecting each side of the housing having a connector, to a side of another housing having a connector.

Another object of the invention is to provide a modular lighting fixture where each connector includes means for electrically connecting each side of the housing having a connector, to a side of another housing having a connector, the light source in the housing being electrically connected to each connector of said housing.

A further object of the invention is to provide a modular lighting fixture where each connector includes means for detachably electrically connecting each side of the housing having a connector, to a side of another housing having a connector.

A still further object of the invention to provide a modular lighting fixture including a plurality of the housings, pivotally connected to each other by one connector means.

Yet another object of the present invention is to provide a modular lighting fixture which can be assembled and disassembled without any special tools.

Finally, another object of the present invention is to provide a modular lighting fixture that is able to provide lighting on all of its sides.

Accordingly, a modular lighting fixture is provided comprising a modular lighting housing having at least three sides and a volume therein, connectors on at least two of the sides of the housing in the form of quarter turn receptacles set into a dielectric medium and surrounded by a conductive metal ring, a pin for detachably, pivotally, and electrically connecting a side of the housing having a connector, to a side of another housing having a connector, and at least one electrical light source withing the housing. Each connector is located by an equal amount, away from a center position located between the edges of the sides containing a respective connector. The housings are pivotally connected to each other by a connector, and can be offset with respect to each other since two different housings with connectors at the same corner can be aligned in two different directions, wherein the connected side of one housing extends beyond the connected side of another housing. Likewise, two housings can be connected at the same corner and aligned in the same direction so that they are aligned with each other. The two housings can also be aligned at different angles by changing the shape of the pin. For example, a pin that is twisted at 90 degrees will result in housings that are oriented at 90 degrees to one another.

In another embodiment, a modular lamp block is provided comprising a modular lamp housing, connector means generally near each corner of the housing for pivotally connecting the housing to a housing of another lamp block so that the lamp blocks are offset, a printed circuit board (PCB) suspended in the center of the housing by a gauge wire which electrically joins the PCB to each connector means, and a plurality of light emitting diodes (LED's) attached to the PCB and arranged on each side of the housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a schematic front view of a preferred embodiment of the block of the present invention, partly exploded and partly in section;

FIG. 2 is a view similar to FIG. 1 of a block in its assembled condition;

FIG. 3 is a side view of the block of FIG. 3;

DESCRIPTION OF THE PREFERRED EMBODIMENTS

Figure 4:
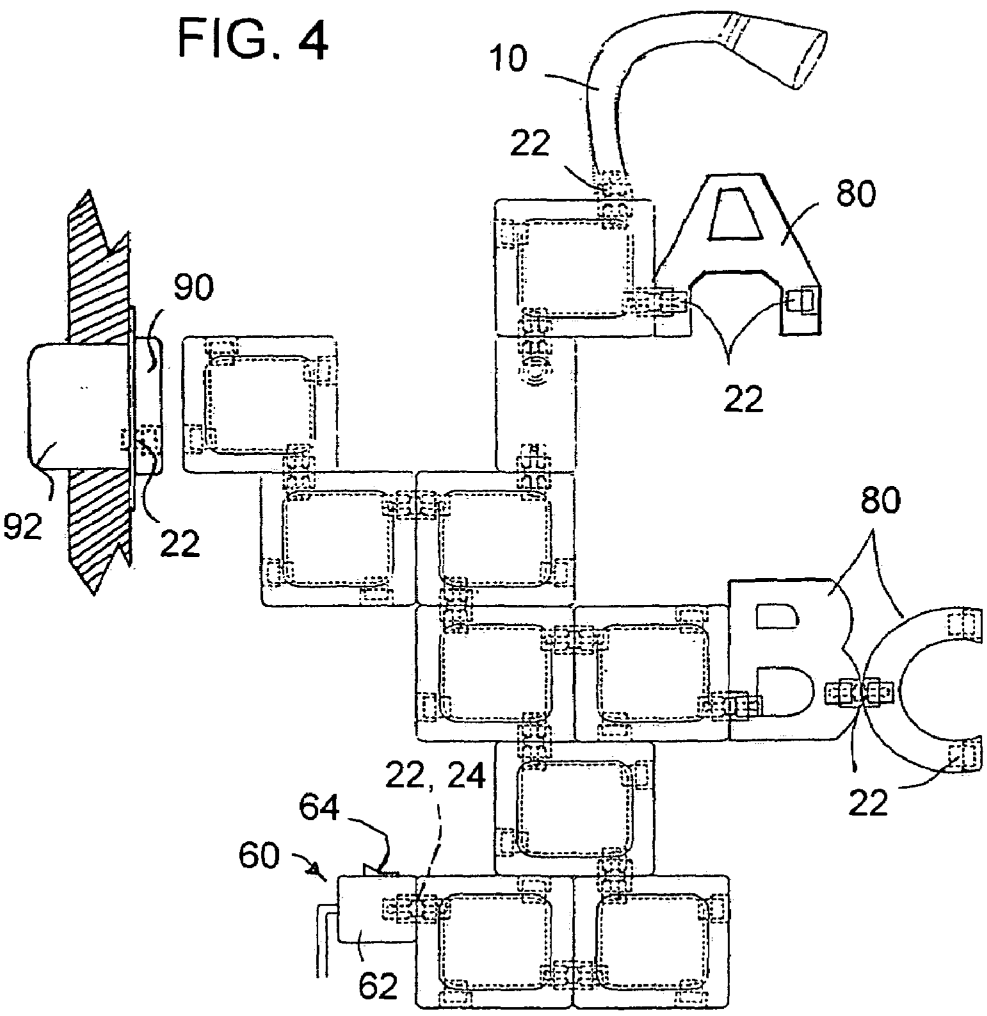
FIG. 4 is a front view of an assembly or fixture of many blocks and other structures of the invention, in which modular lights are connected to electrical or non-electrical decorative objects.

Referring now to the drawings, in which like reference numerals are used to refer to the same or similar elements, FIG. 1 shows a modular lamp block 1 comprising a modular lamp housing 10, connector means generally designated 20 near each corner of the lamp housing 10 for pivotally connecting the lamp housing 10 to another similar housing of another lamp block so that the lamp blocks are offset, a printed circuit board (PCB) 30 suspended in the center of the housing 10 by wires 40 which electrically join the PCB 30 to each connector 20, and a plurality of light emitting diodes (LED's) 50 attached to the PCB and arranged on each side of the housing 10.

The lamp housing 10 comprises a multi, e.g. four-sided structure with front and rear faces for defining a volume inside the housing. The lamp housing may alternatively take the shape of any polygon having at least three sides. The lamp housing 10 is made of cast dyed resin and the front and rear faces are made of acrylic translucent plates 12 shown in FIG. 2, which act as a light diffuser. In FIG. 1 the plate is removed to show the inner volume of the block 1.

The cast resin can be in the form of a variety of shapes and sizes, letters, numbers, figures, etc., which is made possible by the connectors 20, as described below and shown in more detail in FIG. 4. The lamp housing constitutes the entire physical exterior portion of the lamp. The acrylic plates are removable and interchangeable, thus facilitating assembly and exchange of plates having various colors and patterns. The cast dyed resin portion of the housing is also dyed so that an infinite combination of color sequences can be assembled.

Each connector means or connector 20 is a means for connecting lamp blocks both mechanically and electrically to each other and to other structures of the invention. The mechanical connection, which also provides a pivotal connection for the housing 10, is achieved, for example, by a quarter turn fastener assembly available from Southco of Concordville, Pa. (see www.southco.com), which includes a quarter turn spring loaded metal receptacle or receiver socket 22 located near each of the corners of the housing 10 and a metal fastening pin 26 with a first male end inserted into receptacle 22 and a second male end on the opposite side for securing the modular lamp block 1 to another similar modular lamp block having a receptacle 22. The spring of the metal receptacle ensures firstly good mechanical and electrical connection between housings of connected lamp blocks, secondly that two connected blocks cannot be pulled apart unless twisted, and thirdly provides flexibility to the connector 20 between housings so that the block can be maneuvered without interfering with other blocks during assembly and disassembly. It is noted that the quarter turn assembly makes it possible to attach the lamp block 1 to other objects that are not lamps, so long as the other objects contain a receptacle 22.

In use, the fastening pin 26 or 27 is turned one quarter turn to fasten. The pin 26 engages with the receptacle 22. A quarter turn in the opposite direction disengages the assembly.

The two electrical connections of the connector means 20 are formed by the receptacle 22 which is conductive, i.e. metal, and is connected to one of the wires 40, and by a conductive metal ring 24 around each receptacle 22. Pin 26 and 27 are also conductive, i.e. metal, to pass electricity to the next block, and each ring 24 is set in the non-conductive or dielectric material of housing 10, but projects slightly above its outer surface to make contact with the ring of the next block.

The quarter turn receptacle 22 is set into dielectric medium 23, which can be resin, wood, rubber, etc. A conductive metal ring 24 surrounds the receptacle 22, and is mounted to dielectric medium 23. Thus, the receptacle 22 of the quarter turn fastener assembly and the surrounding conductive metal ring 24 form two concentric circles separated by the layer of the dielectric medium 23. The combination of the receptacle 22, dielectric medium 23, and conductive metal ring 24 are cast and/or machined into the resin housing 10. In use, a positive electric charge is applied to the receptacle 22 and a negative charge is applied to the conductive metal ring 24.

The connecting pins of the present invention have opposite heads which can be oriented at different angles from each other, dictating how the housings are oriented with respect to each other. One type of pin 26, which is straight, maintains the plane of the preceding block while another type of pin 27, with a 90 degree angle between the opposite heads of the pin, allows the faces of the two housings to be oriented at a 90 degree angle. Regardless of which type of pin is used, the pin is inserted into a one quarter turn receptacle within a modular lamp block. The exposed end of the two sided pin is then inserted into a second block. The second block must be rotated clockwise one quarter turn. The pin carrying the current allows the new block to enter the live circuit.

The quarter turn receptacle 22 allows a pivotal connection to another housing having a similar quarter turn receptacle. Each receptacle 22 is located by an equal amount, away from a center position between the edges of the sides containing a respective receptacle. Housings that are pivotally connected to each other by receptacles 22 and a pin 26 or 27, are offset with respect to each other if aligned in different directions since each connector 20 is offset by the same amount from the midline between the edges of each side of block 1 as shown best in FIG. 3.

Two one-half watt resistors are on the PCB regulating current. The PCB directs the current to and from each of the four quarter turn female receptacles that reside on the four sides of the resin block housing. These four connections are wired in parallel.

The LED's 50 may have one color, different colors, or may change through the color spectrum. LED's 50 with changing colors may be controlled with a potentiometer and/or wirelessly.

Figure 5:
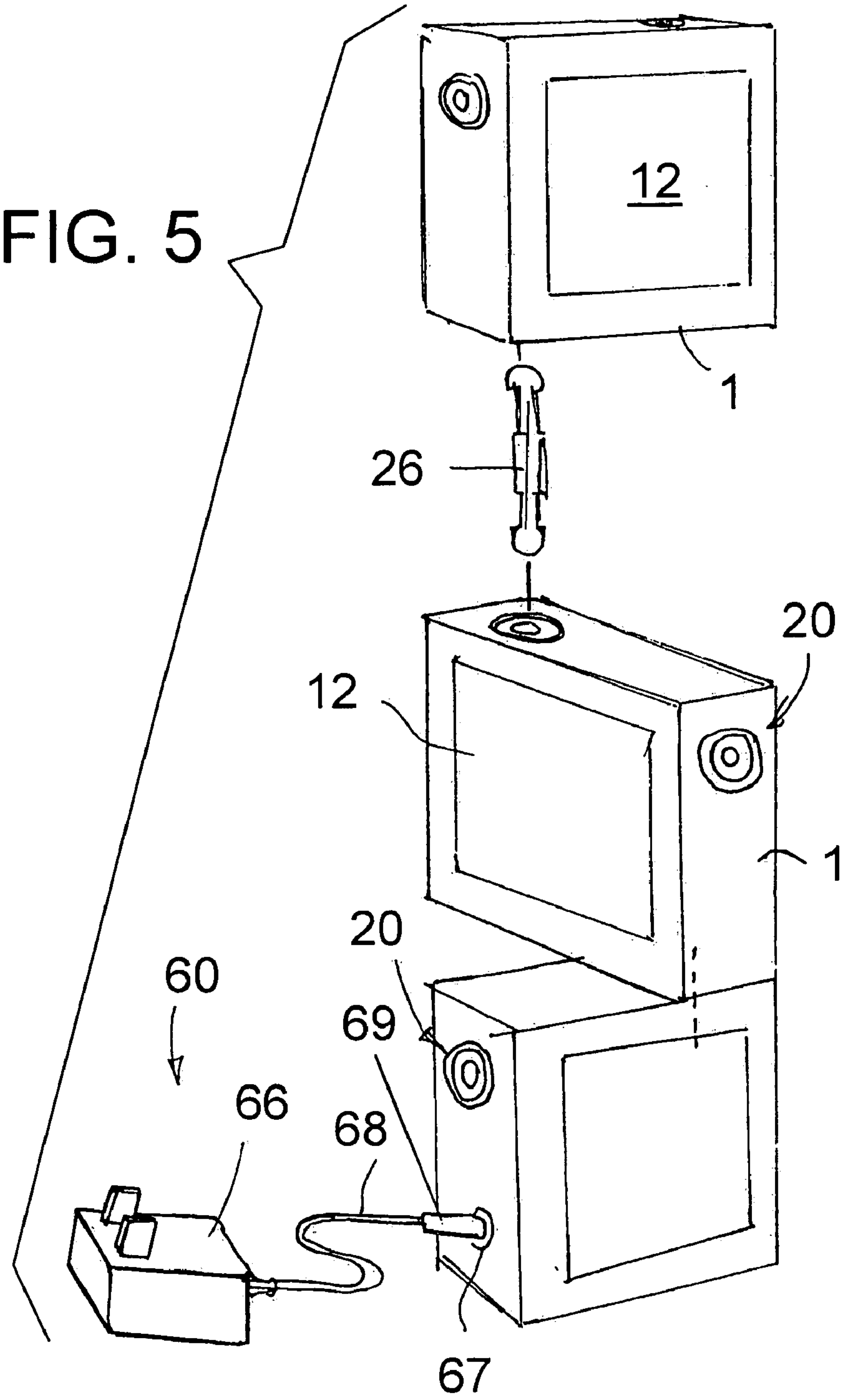
FIG. 5 is a schematic perspective and exploded view of the modular light assembly connected to a transformer for plugging into a wall outlet as a power source.

A shown in FIG. 4, the modular lamp blocks are powered via a power source 60, such as a power nugget 62 with an on/off switch 64, or, as shown in FIG. 5, a transformer 66 with wire 68 and connected 69 plugged into a suitably provided power socket 67 in block 1 and for being plugged into a wall outlet.

Both types of power sources are 12 Volt DC and utilize the connecting pins to attach and carry current to the modular lamp blocks. Nugget 62, however has a quarter turn receptacle 22 like those of the blocks, and a conductive metal ring 24 so that a connection can be made via a pin. As explained earlier, the lamp blocks of the present invention can be mechanically attached to other non-lamp objects so long as those objects have a receptacle 22 as well, such as a wall mounting plate 90 in FIG. 4, having a receptacle 22 for fixing into a wall containing an electrical junction box 92, and for detachably connecting to a block by a pin 26 or 27 to support the assembly on the wall.

The modular lamp blocks may have additional features such as battery operation and illumination as a consequence of the 12 Volt source being a separate connection. The modular lamp block may also have an on and off switch and a rechargeable battery that is charged when connected to the 12 Volt source.

Further, a lamp block 1 of the present invention may be mechanically and electrically connected to other lamp blocks having decorative shapes, or alternatively, the lamp block 1 may be only mechanically connected to non-electric decorative objects which only contain a receptacle 22. For example, FIG. 4 shows a lamp block attached to a goose-neck lamp 70 at the top via a receptacle 22, and to various block letters 80. Instead of a goose-neck lamp 70, lamp block 1 may alternatively be connected to a task lamp or a more practical light source via connector means 20. The block letters may have an electrical light source or may simply be connected as a non-electric decorative object only. In either case, the connector means 20 can be used to connect the block letters to a lamp block 1.

While specific embodiments of the invention have been shown and described in detail to illustrate the application of the principles of the invention, it will be understood that the invention may be embodied otherwise without departing from such principles.

What is claimed is:

1. A modular lighting fixture comprising:

at least one housing having at least three sides connected to each other at a plurality of edges to form a polygon;

the housing having a front surface and a rear surface for defining a volume in the housing; at least one electrically powered light source in the volume;

a separate connector in each of at least two of said sides for pivotally connecting each side of the housing having a connector, to a side of another housing having a connector, wherein said pivotally connected housings are offset with respect to each other; and each connector being located by an equal amount away from a center position between the edges of the sides containing a respective connector;

each connector including means for detachably mechanical connecting the housing to another housing having a connector by turning the housing with respect to the other housing so that the housing cannot be pulled apart from the other housing unless the housing is twisted with respect to the other housing;

each connector also having means for detachably electrically connecting the housing to the other housing for positive and negative electrical connection between the housing and the other housing.

2. The modular lighting fixture of claim 1, wherein each connector includes means for electrically connecting each side of the housing having a connector, to a side of another housing having a connector, the light source in said housing being electrically connected to each connector of said housing.

3. The modular lighting fixture of claim 1, including a plurality of said housings pivotally connected to each other by one of said connectors.

4. The modular lighting fixture of claim 3, wherein each connector includes means for detachably pivotally connecting the housings to each other.

5. The modular lighting fixture of claim 4, wherein each connector includes means for detachably pivotally and for detachably electrically connecting housings to each other, the light source in each housing being electrically connected to each connector.

6. The modular lighting fixture of claim 1, wherein the housing was four sides.

7. The modular lighting fixture of claim 6, wherein the four sides are equal to each other in size.

8. The modular lighting fixture of claim 7, including a connector in every one of said sides.

9. The modular lighting fixture of claim 1, wherein said means for detachably mechanically and for detachably electrically connecting for each connector includes a receiver socket opening into the side containing said connector, for receiving a connecting turn pin for detachably pivotally and for detachably electrically connecting housings to each other, an electrical contact ring around each receiver socket opening, and a connecting pin for each receiver socket, each light source being electrically connected to each receiver socket and to each contact ring of said housing.

10. The modular lighting fixture of claim 9, wherein the housing was four sides.

11. The modular lighting fixture of claim 10, wherein the four sides are equal to each other in size.

12. The modular lighting fixture of claim 11, including a connector in every one of said sides.

13. The modular lighting fixture of claim 1, wherein said sides each comprises a side wall bounding said volume, the housing having a front wall of translucent material forming said front surface and bounding said volume.

14. The modular lighting fixture of claim 13, including a rear wall of translucent material forming said rear surface and bounding said volume.

15. The modular lighting fixture of claim 1, wherein said light source comprises a low-voltage circuit electrically connected to each connector and at least one low-voltage lamp connected to said circuit.

16. The modular lighting fixture of claim 15, wherein the low-voltage lamp is an LED.

17. The modular lighting fixture of claim 16, including a plurality of housings each for detachably pivotally and for detachably electrically connecting to another housing at one connector, one of said housings having a power connection for connection to line power for supplying electrical power to all light sources of said connected housings.

18. The modular lighting fixture of claim 17, wherein said means for detachably mechanically and for detachably electrically connecting for each connector includes a receiver socket opening into the side containing said connector, for receiving a connecting turn pin for detachably pivotally and for detachably electrically connecting housings to each other, an electrical contact ring around each receiver socket opening, and a connecting pin for each receiver socket, each low-voltage circuit being electrically connected to each receiver socket and to each contact ring.

19. A modular light assembly comprising:

a light housing;

connector means on at least one side of said housing for electrically and pivotally connecting said light housing to at least one other light housing of another modular light assembly at an offset; and at least one light source disposed within the light housing and electrically connected to the connector means;

the connector means comprising: a metal receptacle set into a nonconductive medium; a conductive metal ring surrounding said receptacle and mounted to the non-conductive medium of the receptacle; and a metal fastening pin with one male end inserted into said receptacle, and a second opposite male end for securing the modular light assembly to either similar modular light assemblies or modular light assemblies of different shapes and colors containing said receptacle, said medium, and said conductive metal ring; each connector means including means for detachably mechanical connecting the housing to another housing having a connector by turning the housing with respect to the other housing so that the housing cannot be pulled apart from the other housing unless the housing is twisted with respect to the other housing.

20. A modular light assembly according to claim 19, wherein the connector means further comprises:

the metal receptacle being a quarter turn metal receptacle set into the medium; and the metal fastening pin with one male end inserted into said receptacle, and the second opposite male end for securing the modular light assembly to a power source containing said receptacle, medium and conductive metal ring.

21. A modular light assembly according claim 19, wherein the connector means further comprises:

the metal receptacle being a quarter turn metal receptacle set into a nonconductive medium; and the metal fastening pin with one male end inserted into said receptacle, and the second opposite male end for securing the modular light assembly to a non-electric object containing said receptacle only.

22. A modular light assembly according to claim 19, wherein said housing is a polygon.

23. A modular light assembly according to claim 19, wherein said housing has at least three sides.

24. A modular light assembly according to claim 19, wherein the light source is an LED.

25. A modular light assembly according to claim 19, wherein a plurality of light sources are disposed within the housing.

26. A modular light assembly according to claim 19, further comprising a Printed Circuit Board (PCB) located in the housing and connected to a wire which electrically joins the PCB to said connector means and at least one light source attached to the PCB.

27. A modular light assembly comprising:

a light housing having four equal sides, a front and a rear;

a connector at each side of the housing, each connector being for detachably and mechanically pivotally and electrically connecting said light housing to at least one other electrical device via said mechanical connectors and electrical connectors or to a non-electrical device via only said mechanical connectors;

a circuit board located in the housing and connected to a wire which electrically joins to each connector; and at least one light source attached to the circuit board;

each connector being positioned in its respective side of the housing to be midway between front and rear edges of the respective side and to be offset toward one end of the respective side by an amount that is equal for each side of the housing and in the same direction around the housing and for each side of the housing so that like housings are detachably and mechanically and electrically and pivotally connected to each other at the connectors in equal offset positions with respect to each other.

28. The modular light assembly according to claim 27, wherein said electrical device is another similar modular light assembly.

29. The modular light assembly according to claim 27, wherein said electrical device is a modular light assembly of a different shape or color.

30. The modular light assembly according to claim 27, wherein said electrical device is a power source.

31. The modular light assembly according to claim 27, wherein said non-electrical device is a decorative object.

32. The modular light assembly according to claim 27, wherein said housing has a translucent wall at least at one of the front and rear of the housing.

33. The modular light assembly according to claim 32, wherein said translucent wall has a color.

* * * * *